Aug. 2, 1927.  C. CHRISTENSEN  1,637,603
LAWN MOWER
Filed April 10, 1920   3 Sheets-Sheet 3
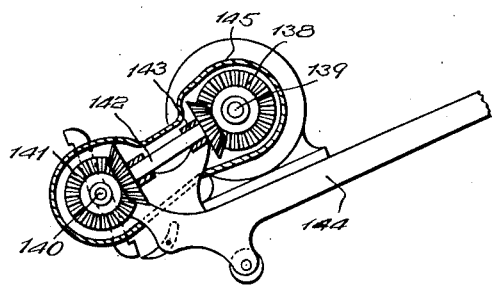
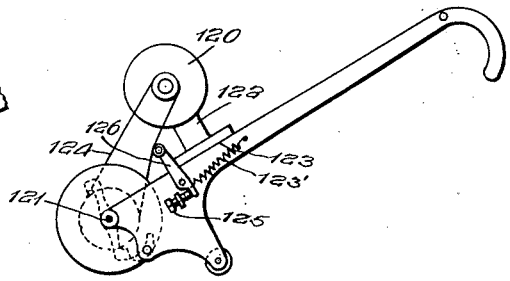
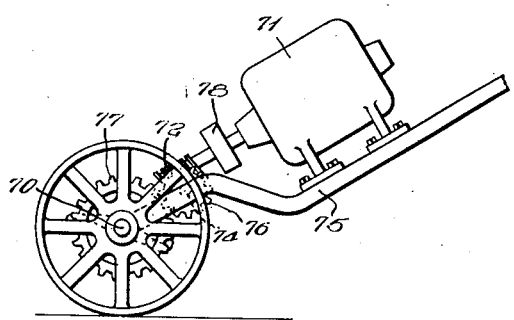
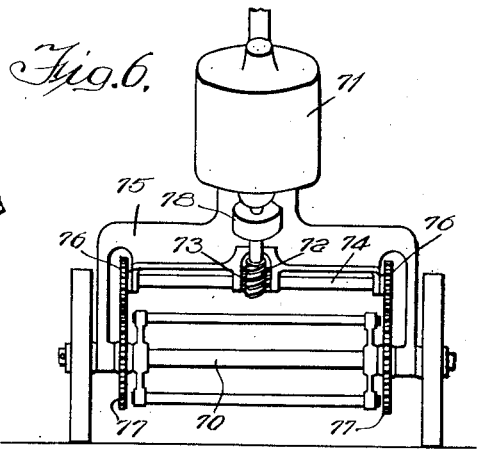
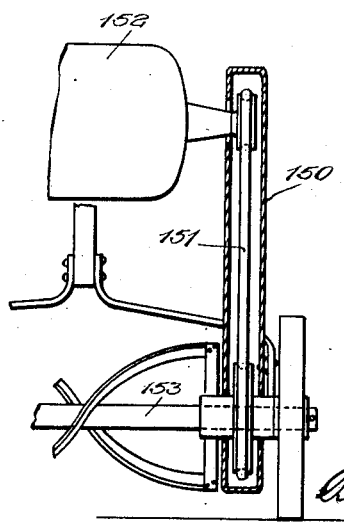
Inventor:
Christen Christensen
Brown Boettcher & Dienner Patented Aug. 2, 1927.

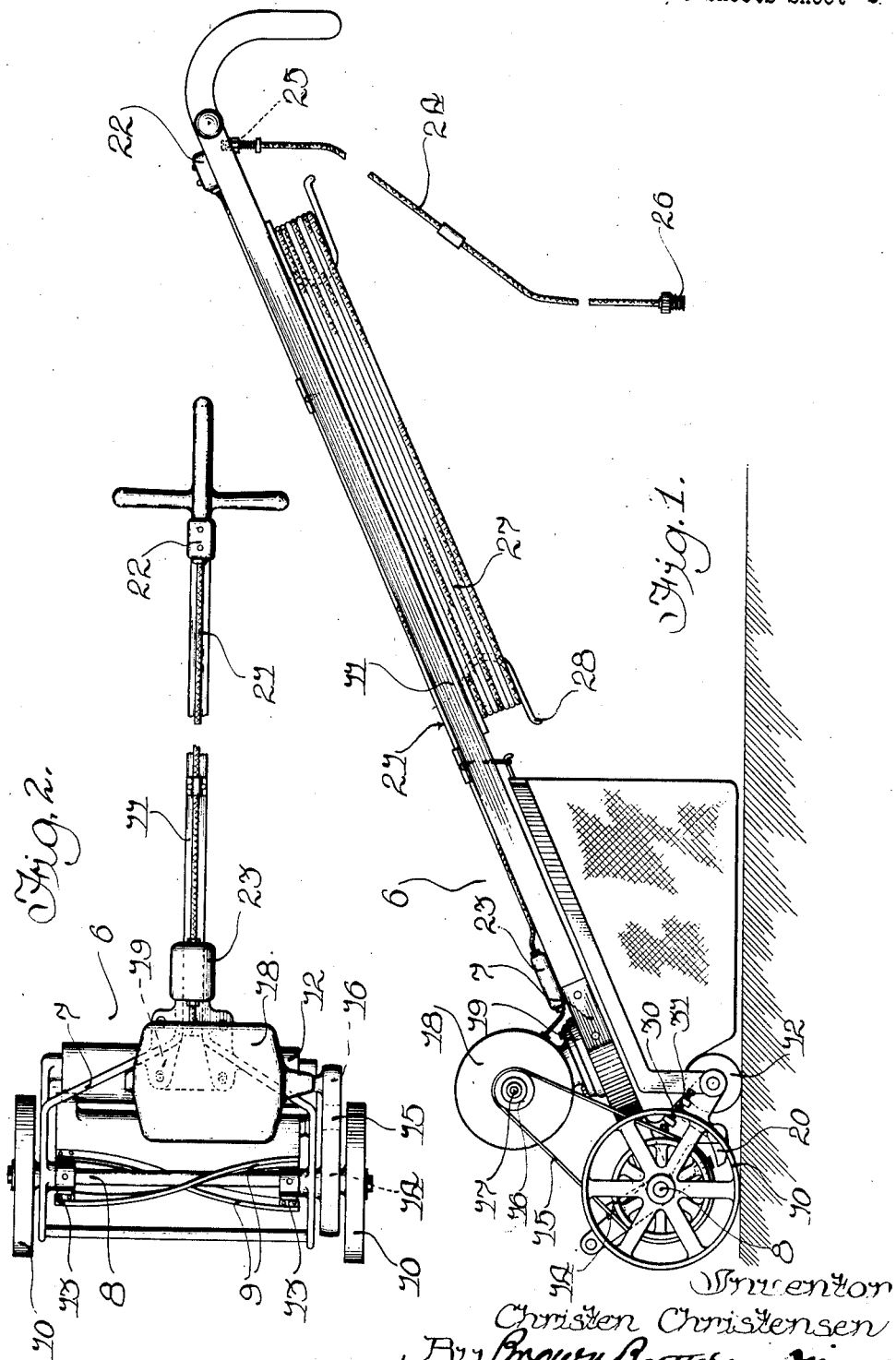

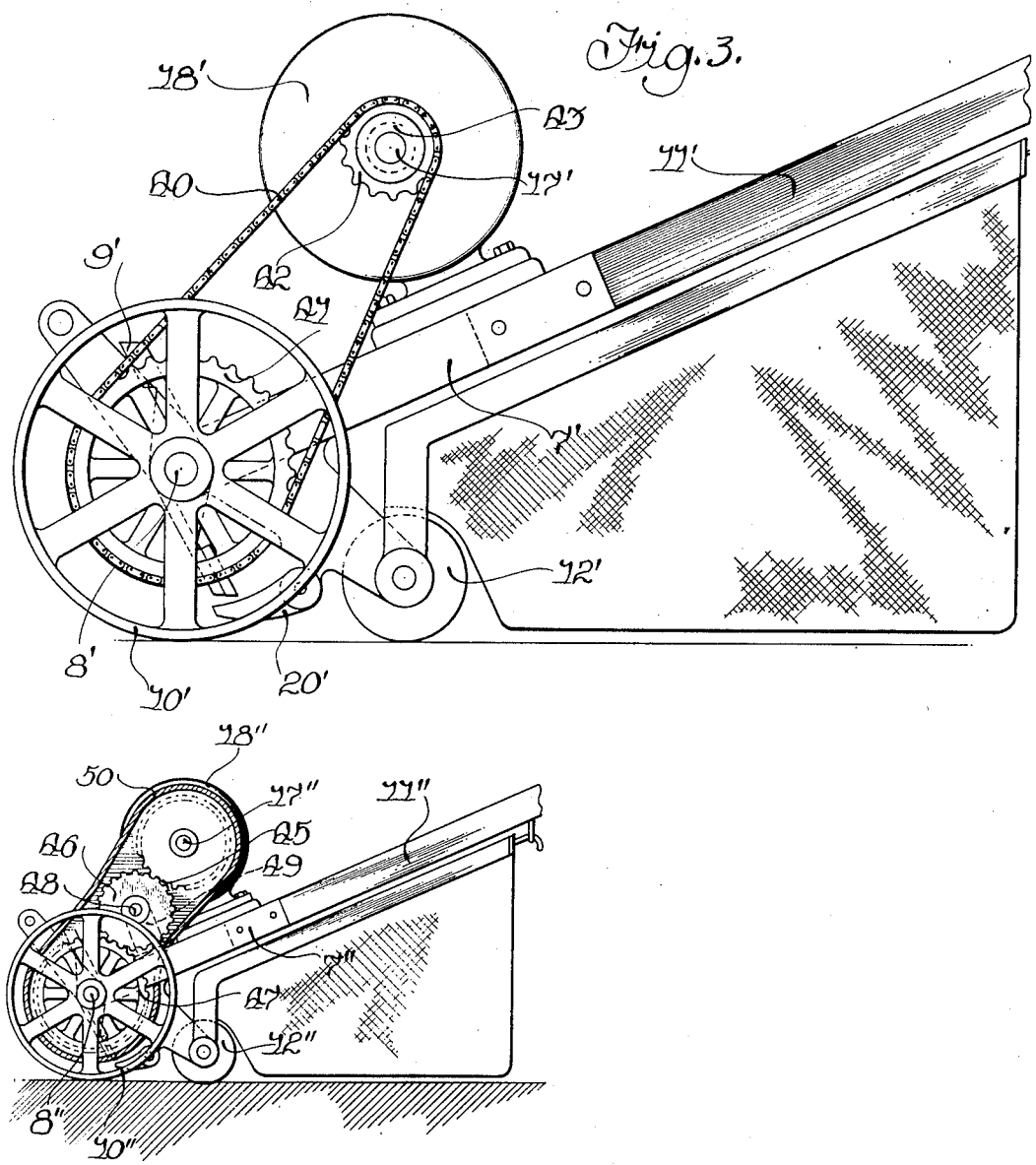

1,637,603

UNITED STATES PATENT OFFICE.

CHRISTEN CHRISTENSEN, OF CHICAGO, ILLINOIS.

LAWN MOWER.

Application filed April 10, 1920. Serial No. 372,790.

My invention relates to lawn mowers.

The general lack of practicability of the usual manually driven mower, particularly in caring for a plot of considerable area is well known.

Close and even cutting is impossible and the effort necessary on the part of the operator is considerable. Furthermore, the operation of the cutting blades of the usual mower of this general description is directly dependent upon the speed at which the mower is pushed or moved over the lawn. This is a considerable disadvantage, particularly in working close to the borders and corners and around bushes and shrubbery of the lawn or in the event that the blades of grass have grown to considerable height.

I am aware that lawn mowers utilizing electricity as a motive power have been provided heretofore in the art. The prior art devices of this sort have not attained a high order of practicability. They have been heavy, complicated and expensive in construction. They have not possessed the required durability and ruggedness which comes from minimizing the number of parts and simplifying the structure, and the mounting of each part and the connections between the parts. Frequent repair has been necessary and the problem of maintaining the proper working condition of such mowers has been a difficult one.

The object of my invention is the provision of a mower which is an improvement in cost, construction, manufacture and operation over the devices of the prior art. I aim to minimize the faults of the prior devices, and the structural improvements provided to this end are important.

To acquaint those skilled in the art with the manner of constructing and practicing the invention, I shall now describe in connection with the accompanying drawings certain specific embodiments of the same. In the drawings:—

Fig. 1 is an enlarged side elevational view of a mower embodying the invention;

Fig. 2 is a plan view of the same certain parts not being shown;

Figs. 3, 4 and 5 are fragmentary side elevational views of modifications of the invention;

Fig. 6 is a plan view of the modification shown in Fig. 5;

Fig. 7 is an enlarged side elevational view of another modification;

Fig. 8 is a fragmentary side elevational view of still another modification; and Fig. 9 is an enlarged fragmentary view showing a guard in connection with a belt drive between the motor and the cutter.

The mower 6 shown in Figs. 1 and 2 comprises generally a frame 7, cutter or knife reel shaft 8, rotary cutter blades 9, supporting wheels 10, handle bar 11 and supplemental ground roller 12.

The supporting wheels 10 are loosely mounted upon the opposite ends of the cutter or knife reel shaft 8, while the rotary cutter blades are fixed for rotation with the shaft 8 through the sleeved block members 13 adjacent their opposite ends. Of course, the wheels 10 may be fixed upon the shaft 8 and the cutter mounted loosely thereupon for rotation independently of the shaft if so desired. A pulley 14 either fixed upon the shaft 8 or connected with the cutter is engaged by a suitable belt 15, the opposite end of which belt 15 engages the pulley 16 mounted upon the shaft 17 of an electric motor 18. The electric motor 18 is mounted upon a bracket member 19 carried by the converging arms of the frame 7 adjacent their point of attachment with the lower end of the handle bar 11. A relatively fixed knife or blade 20 cooperates with the rotary cutter blades 9 in the usual manner.

Conductors 21 lead from the motor 18 along the handle bar 11 to a switch 22 of conventional or any preferred type mounted upon the handle bar 11 adjacent the grasping handle formed contiguous to the upper end thereof. Perfect control of the electric motor is thereby had without interfering with the operator's manual hold of the grasping handle. A fuse 23 interposed in the conductor 21 provides for safeguarding the motor by disconnecting the same from the source of current in the event an excessive load is placed upon the motor, such as for example, in the event a serious obstruction is encountered in the path of movement of the rotary cutter. A suitable switch might be used in place of the fuse 23 should it be desired to do so. Of course, the motor is disconnected from the current source only in the event that sufficient slippage is not allowed by the belt 15 in the event that an obstruction is met.

The electric current for the motor may be supplied from any suitable source of electrical energy. The source may be portable independently of the mower, or it may comprise a fixed source or a plurality of fixed sources at spaced intervals where the care of large areas is concerned. Electrical connection between the source and motor 18 is made either directly through a transmission line 24 having connection at its opposite ends through suitable connecting members 25 and 26 and a conductor 21 with the source of current or the line 24 is connected through the connecting member 26 with a transmission line 27 wound upon a spring reel 28 suspended from the under surface of the handle bar 11. Obviously the spring reel 28 will allow for various positions of the motor 18 relative the source.

A stem 30 threaded through a bracket or lug 31 struck up from the frame 7 of the mower is provided with a head adjacent its inner end for cooperation with the driving belt 15 between the motor 18 and shaft 8 and a head adjacent its outer end adapted to be engaged by a suitable tool whereby the belt 15 may be tightened about the pulleys 14 and 16 as desired. It will be evident from Figure 1 that by merely turning the stem 30 the same may be moved toward or from the belt 15 to vary the tightness of the belt on the pulleys.

In Figure 3 I have illustrated an alternative form of my invention. In this form of the invention the cutter or blade reel shaft 8' is driven from the motor 18' through a chain 40. The driving chain 40 is trained over a sprocket wheel 41 mounted upon the cutter or knife reel shaft 8' and a sprocket wheel 42 mounted upon the motor shaft 17'. The sprocket wheel 42 is preferably fixed upon the shaft 17' through a suitable slip clutch 43 so that in the event a serious obstruction is encountered the driving connection between the motor 18' and the shaft 8' will be suspended or discontinued until such obstacle has been removed. The clutch 43 may be of any desired type, forming no part of the present invention.

In the form of the invention shown in Figure 4 the drive from the motor 18'' is transmitted from a gear 45 mounted upon the shaft 17'' thereof through an idler gear or pinion 46 and thence to the cutter or blade reel shaft 8'' by way of a gear 47 mounted thereupon. The idler 46 is mounted upon a shaft 48, which shaft bears in suitable bracket members 49 mounted in an upright position upon the frame 7'' of the mower. The gears 45, 46, 47 are encased in a casing or housing 50 which housing serves as a guard for protecting these gears. By making the casing 50 substantially dust and oil tight a suitable lubricant could be retained therein for insuring proper lubrication of these gears at all times.

In the embodiment illustrated in Figures 5 and 6 the cutter or blade wheel shaft 70 is driven from the motor 71 through a worm and series of gearings. The motor shaft is provided with a worm 72 meshing with a worm gear 73 mounted upon a shaft 74, the opposite ends of which shaft 74 bear in suitable lugs struck out from the mower frame 75. The drive is transmitted from the shaft 74 through the pinions 76 mounted thereupon to the blade shaft 70 by way of the intermeshing gears 77 mounted upon the blade shaft. A suitable slip clutch 78 is interposed in the drive between the motor 71 and the shaft 70 so that in the event a serious obstruction is encountered the driving connection between the motor and the shaft will be disconnected until such obstacle has been removed.

In the embodiment shown in Figure 7 the motor 120 is mounted through a bracket member 122 upon the mower frame 123. The cutting shaft 121 is driven from the motor 120 through a belt 124. A belt tightener comprising an arm 126 having a belt engaging roller adjacent its outer end is pivotally mounted upon the mower frame 123. An adjusting screw mounted against axial movement through a lug struck up from the mower frame 123 is threaded into the inner end of the arm 126. A spring 123' retains the roller carried by the arm 126 in engagement with the belt 124 to tighten the same; slacking of the belt being accomplished by threading the adjusting screw into the inner end of the arm 126 to withdraw the roller from the belt 124.

In the embodiment shown in Figure 8 a bevel gear 138 is mounted upon the motor shaft 139. The cutter blade shaft 140 is likewise provided with a bevel gear 141. The drive is transmitted from the motor to the shaft 140 through an intermediate shaft 142 carrying bevel gears at its opposite ends in mesh with the gears 138 and 141 respectively. The intermediate shaft 142 is mounted in suitable upright bearings 143 carried by the mower frame 144. A suitable guard 145 effectively encloses the gears 138 and 141 as well as those carried by the intermediate drive shaft 142.

In Figure 9 I have shown a guard 150 in connection with the driving belt 151 which driving belt 151 forms the driving connection between the motor 152 and the cutter 153.

While I have described certain illustrative modifications of the invention in detail, I do not intend thereby to limit the invention to such details, as other modifications and changes are contemplated and I have drawn the appended claims accordingly.

I claim:

1. In a lawn mower, a mower frame, a shaft carried by said frame, mower bearing wheels carried by said shaft, a cutter carried by said shaft, and a source of driving effort carried by the mower remote from said shaft for driving said cutter, said cutter being disconnected from said bearing wheels and driven independently of said wheels at all times.

2. In a lawn mower, a mower frame, a shaft carried by said frame, mower bearing wheels loosely journaled on the outer ends of said shaft, a cutter fixed upon said shaft for rotation therewith, a source of driving effort remote from said shaft, and a driving connection between said source and said shaft, said cutter being disconected from said bearing wheels and driven independently of said wheels at all times.

3. In a lawn mower, a mower frame, a shaft carried by said frame, cutting mechanism carried by said shaft, mower bearing wheels loosely journaled on the shaft, a motor carried by the frame remote from said shaft, and a driving connection between said motor and said shaft, said cutter being disconnected from said bearing wheels and driven independently of said wheels at all times.

4. In a lawn mower, a mower frame, a shaft carried by said frame, mower bearing wheels loosely journaled on said shaft, a cutter on said shaft, a motor mounted on the mower frame remote from said shaft, a driving connection between said motor and the shaft, and a flexible transmission line for the motor, said line being connected with a source of supply and said cutter being disconnected from said bearing wheels and driven independently of said wheels at all times.

5. In a lawn mower, a mower frame, a shaft carried by said frame, mower bearing wheels loosely journaled on said shaft, a cutter on said shaft, a source of driving effort caried by the mower remote from said shaft, a driving connection between said source and the cutter, and means for adjusting said driving connection, said cutter being disconnected from said bearing wheels and driven independently of said wheels at all times.

In witness whereof I hereunto subscribe my name this 7th day of April A. D. 1920.

CHRISTEN CHRISTENSEN.